United States Patent
Brose et al.

(10) Patent No.: US 10,857,400 B2
(45) Date of Patent: Dec. 8, 2020

(54) ACTIVATED CARBON ABSORBER

(71) Applicant: SATA GmbH & Co. KG, Kornwestheim (DE)

(72) Inventors: Jens Brose, Ottmarsheim (DE); Ralf Gehrung, Stuttgart (DE); Marco Schönemann, Wendlingen (DE)

(73) Assignee: SATA GMBH & CO. KG, Kornwestheim (DE)

( * ) Notice: Subject to any disclaimer, the term of this patent is extended or adjusted under 35 U.S.C. 154(b) by 625 days.

(21) Appl. No.: 15/506,745

(22) PCT Filed: Aug. 25, 2015

(86) PCT No.: PCT/EP2015/001729
§ 371 (c)(1),
(2) Date: Feb. 26, 2017

(87) PCT Pub. No.: WO2016/030012
PCT Pub. Date: Mar. 3, 2016

(65) Prior Publication Data
US 2017/0252589 A1 Sep. 7, 2017

(30) Foreign Application Priority Data

Aug. 26, 2014 (CN) ...................... 2014 2 0486170 U
Aug. 26, 2014 (CN) ...................... 2014 2 0486205 U
Aug. 26, 2014 (CN) ...................... 2014 2 0486333 U

(51) Int. Cl.
*B01D 53/02* (2006.01)
*A62B 23/02* (2006.01)
(Continued)

(52) U.S. Cl.
CPC .............. *A62B 23/02* (2013.01); *A42B 3/285* (2013.01); *A62B 7/02* (2013.01); *A62B 7/10* (2013.01);
(Continued)

(58) Field of Classification Search
CPC ......... A42B 3/285; A62B 19/00; A62B 23/02; A62B 7/02; A62B 9/003; A62B 9/04; B01J 20/3416; B05B 7/2416; B05B 7/2491
See application file for complete search history.

(56) References Cited

U.S. PATENT DOCUMENTS 2,519,296 A * 8/1950 Simpson ............ B01D 53/0423
96/126
3,118,286 A 1/1964 Schroeder
(Continued)

FOREIGN PATENT DOCUMENTS

DE 870066 3/1953
DE 1187932 2/1965
(Continued)

OTHER PUBLICATIONS

International Search Report dated Mar. 17, 2016 for PCT/EP2015/001729 filed Aug. 25, 2015.
(Continued)

*Primary Examiner* — Christopher P Jones
(74) *Attorney, Agent, or Firm* — Paul D. Bianco; Gary S. Winer; Fleit Intellectual Property Law

(57) ABSTRACT

An activated carbon adsorber, in particular an activated carbon adsorber for use by a user of an externally ventilated breathing mask or breathing hood. The activated carbon adsorber includes a housing for accommodating a filter cartridge, and the housing has the following features: an air inlet supply port to receive compressed air from an air supply unit; a connector for connecting to a breathing mask or hood; a unit which can be fastened to the body of or to or on the housing of the activated carbon adsorber and which is capable of forming a detachable connection with another component in particular a sliding or slip connection.

34 Claims, 11 Drawing Sheets

(51) Int. Cl.
  *A42B 3/28*     (2006.01)
  *A62B 7/02*     (2006.01)
  *A62B 9/00*     (2006.01)
  *A62B 9/04*     (2006.01)
  *A62B 19/00*    (2006.01)
  *B05B 7/24*     (2006.01)
  *A62B 7/10*     (2006.01)
  *B01J 20/34*    (2006.01)

(52) U.S. Cl.
  CPC ............... *A62B 9/003* (2013.01); *A62B 9/04* (2013.01); *A62B 19/00* (2013.01); *B01J 20/3416* (2013.01); *B05B 7/2416* (2013.01); *B05B 7/2491* (2013.01)

(56) References Cited

U.S. PATENT DOCUMENTS

| | | | |
|---|---|---|---|
| 3,949,966 A | 4/1976 | Fabish | |
| 4,899,740 A | 2/1990 | Napolitano | |
| 5,724,963 A | 3/1998 | Seeley | |
| 7,314,153 B2 | 1/2008 | Musarella et al. | |
| 7,464,908 B2 | 12/2008 | Files | |
| 7,658,190 B1* | 2/2010 | Phifer | A62B 7/10 128/201.25 |
| 8,006,877 B2 | 8/2011 | Lowry et al. | |
| 8,134,066 B2 | 3/2012 | Shkolnikov et al. | |
| 8,584,916 B1 | 11/2013 | Chen | |
| 9,599,372 B2 | 3/2017 | Bancroft et al. | |
| 2002/0073994 A1* | 6/2002 | Patel | A62B 9/02 128/201.17 |
| 2003/0160075 A1 | 8/2003 | Musarella et al. | |
| 2006/0032647 A1 | 2/2006 | Petty | |
| 2006/0065261 A1 | 3/2006 | Files | |
| 2007/0023468 A1 | 2/2007 | Ford | |
| 2008/0091176 A1* | 4/2008 | Alessi | A61K 9/0004 604/892.1 |
| 2008/0203124 A1 | 8/2008 | Gorings | |
| 2008/0257928 A1 | 10/2008 | Lowry et al. | |
| 2011/0244070 A1* | 10/2011 | Schmidt | B29C 45/281 425/557 |
| 2013/0206139 A1 | 8/2013 | Krepel et al. | |
| 2014/0123978 A1 | 5/2014 | Bancroft et al. | |
| 2015/0360060 A1* | 12/2015 | Dehmke | A62B 9/04 128/201.25 |

FOREIGN PATENT DOCUMENTS

| | | |
|---|---|---|
| DE | 1260984 | 2/1968 |
| DE | 10 2013 000809 A1 | 7/2014 |
| DE | 202015005881 | 10/2015 |
| EP | 0747095 | 12/1996 |
| WO | 2000/77469 | 12/2000 |
| WO | 01/97914 A1 | 12/2001 |
| WO | 2009/048584 | 4/2004 |
| WO | 2006/108042 A1 | 10/2006 |
| WO | 2014012064 A2 | 1/2014 |

OTHER PUBLICATIONS

Written Opinion dated Apr. 29, 2016 for PCT/EP2015/001729 filed Aug. 25, 2015.
English translation of International Preliminary Report on Patentability dated Feb. 28, 2017 for PCT/EP2015/001729 filed Aug. 25, 2015.
English translation of Written Opinion dated Apr. 29, 2016 for PCT/EP2015/001729 filed Aug. 25, 2015.

\* cited by examiner

ACTIVATED CARBON ABSORBER

TECHNICAL FIELD

The present invention relates to an activated carbon adsorber, in particular an activated carbon adsorber for use by a user of an externally ventilated breathing mask or breathing hood.

TECHNICAL BACKGROUND

Technical Background

During lacquering processes carried out by means of spray guns operated with pressurized air and with the use of solvents, it is unavoidable that a so-called "overspray" is produced. This means that the operating space is contaminated with an unusual amount of paint or lacquer droplets, which is also very detrimental to the human body. For this reason, health protection is needed for the worker. Breathing masks, which preferably can be secured over the entire head and in particular in front of the entire facial area of the worker, are excellently suited for this purpose and they offer a maximum of health protection. Such breathing masks are usually supplied with pressurized air independently of the environmental air. For this purpose, pressurized air is generally first supplied to an air preparation system, which, first system, comprises a single-stage or multi-stage filter system. The filtered air is then supplied via a pressurized air hose to a waist band or hip belt which, as a rule, is provided with at least one additional air preparation module. An air preparation module can be an activated carbon adsorber; another air preparation module can be an air heater or an air moisturizer. By means of the activated carbon adsorber module, undesired vapors and gases which may still be contained in the pressurized air can be removed. And, by means of an air heater module and/or an air moisturizer module, additional advantages for health and wellbeing can be achieved. An additional advantageous embodiment consists of fastening an air regulation and distribution module on the waist band or hip belt. The entire structure is usually referred to as belt unit. Such an advantageous belt unit for use with a breathing hood is known under the product name "Vision 2000" from the SATA GmbH & Co. KG.

Today, the users of breathing systems make increased demands for the provision of a guarantee of occupational protection and for user friendliness. On the other hand, the manufacturers and suppliers want products that can be produced as easily as possible, assembled easily, and if necessary, disassembled again easily.

Problem of the Invention

The problem of the invention is to provide a possibility showing how the above-mentioned problems can be solved.

Solution of the Problem of the Invention

The problem of the invention is solved by an activated carbon unit as disclosed herein. The housing of the activated carbon adsorber module according to the invention can be fitted, mounted, installed, handled, and disassembled easily.

BRIEF DESCRIPTION OF THE DRAWINGS

The appended drawings form part of the present description and are provided for a better understanding of the present invention. They illustrate possible embodiments of the present invention and are used to explain the principles of the present invention together with the description. In the appended drawings, identical components are marked with identical reference numerals.

The following is represented in the drawings.

GENERAL DESCRIPTION OF THE EMBODIMENTS

Figure 1A:
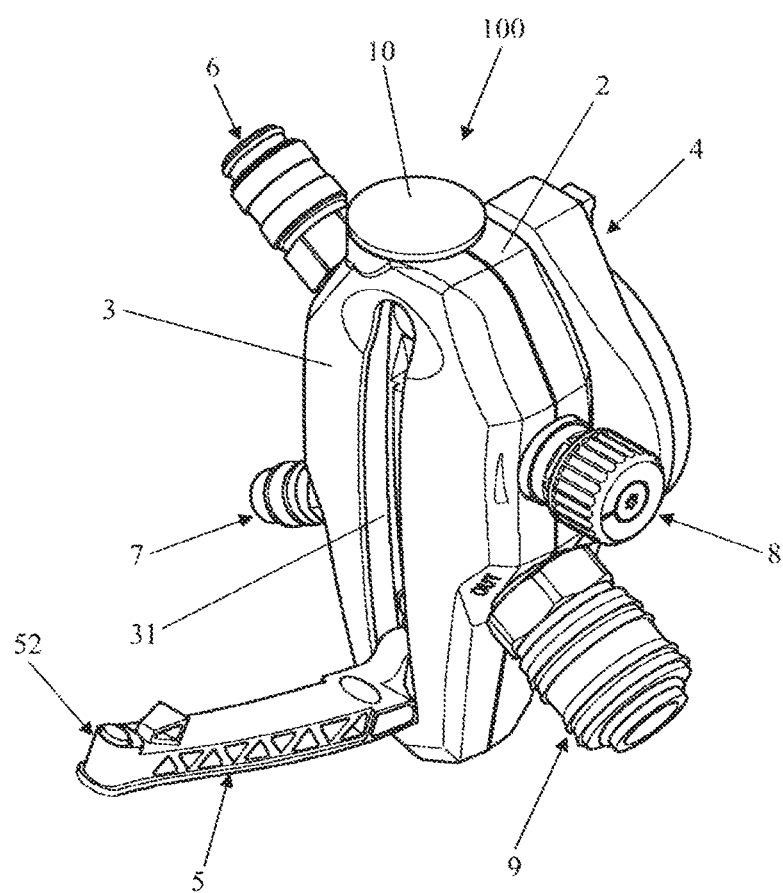
FIG. 1A illustrates the front part of the activated carbon adsorber according to an embodiment of the present invention.

The following detailed description is to be understood in reference to the drawings, which form a part of the description and which show an exemplary representation of the possibilities that the invention offers. In the drawings, indications of direction, such as, at the top, at the bottom, inner and outer should be understood in reference to the drawings described. Components of the embodiments of the invention can be arranged in several different directions, so that the indications of direction are used only for illustration and thus do not imply any limits. The description should also be understood to the effect that other embodiments can be selected, and structural or logical modifications are based on the premise that they are allowed in accordance with the scope of the invention. Therefore, the following detailed description should not be understood as a limitation. It is understood that features of the different embodiments described here can be combined with one another, if there are no special notes to the contrary.

The activated carbon adsorber 100 according to the invention is intended for use by a user of an externally ventilated breathing mask or breathing hood.

Figure 8:
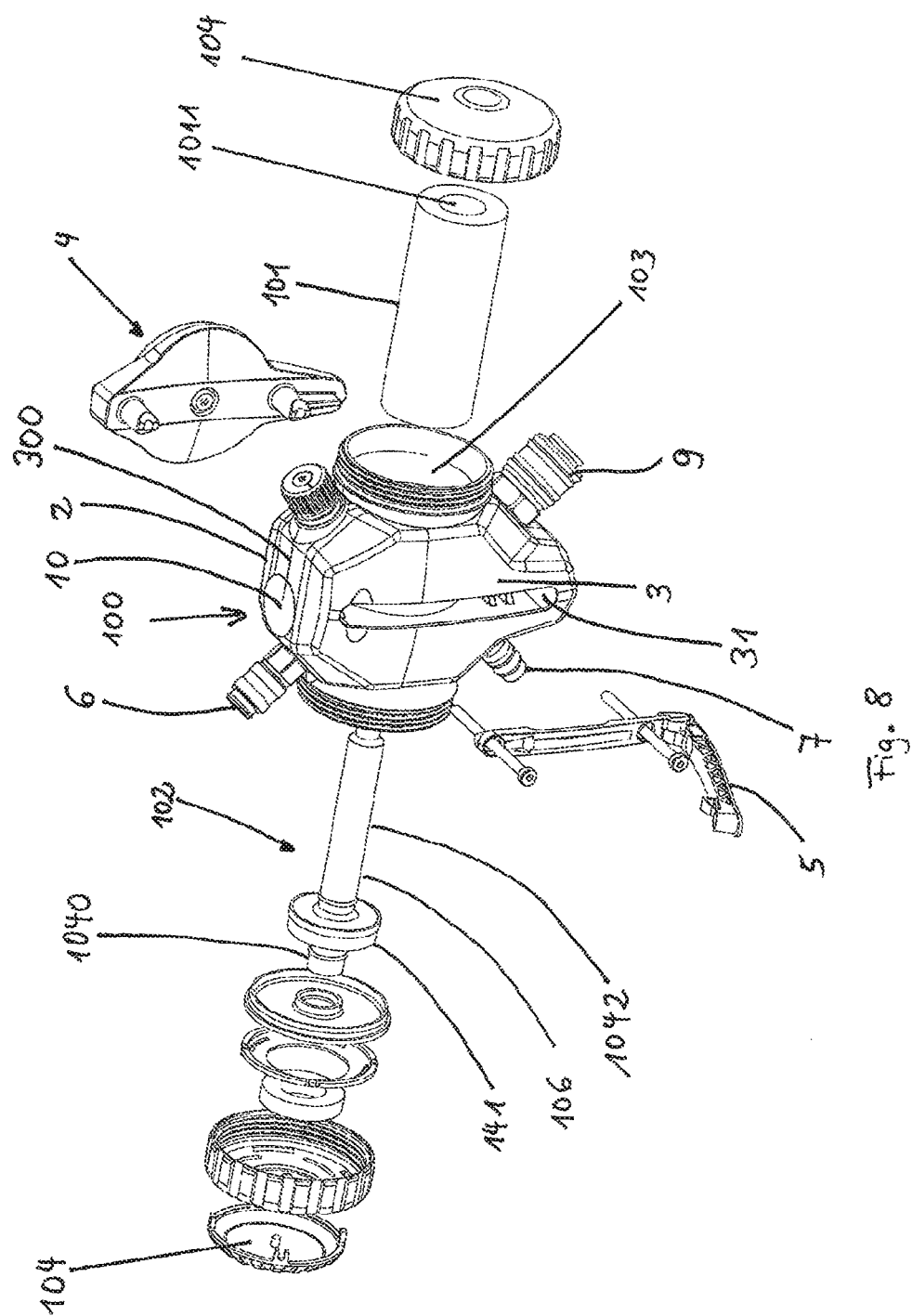
FIG. 8 shows a particularly preferable embodiment of the activated carbon adsorber according to the present invention.

As can be seen in FIG. 8, the activated carbon adsorber 100 according to the invention comprises a filter cartridge 101, which is arranged in a special housing 2, 3. The housing 2, 3 is composed of two hollow half spheres or half shells 2 and 3. The half shells 2, 3 are connected to one another along a seam line 300. The connection can be a detachable or undetachable connection. Clipping, gluing or welding connections are possible.

The half spheres or shells 2, 3 each are provided on two mutually facing sides with a relatively large opening 103, one of which enables the insertion and removal of an activated carbon-containing component 101, and the other enables the insertion and removal of a device for temperature compensation. Each opening 103 can be closed with a screw cap 104. In other designs, in which no device for temperature compensation or another module is to be inserted into the housing 2, 3 of the activated carbon adsorber, a single opening 103 is sufficient in principle.

In the represented preferred embodiment of the invention, the activated carbon is accommodated in a filter cartridge 101, which is designed in the form of a pipe and, in particular, a straight cylindrical pipe. The carbon particles are accommodated in the walls of the pipe 101, which are closed at their ends. The outer diameter of the pipe 101 is slightly smaller than the diameter of the openings 103, and the length of the pipe 101 is slightly smaller than the diameter of the two housing half spheres or shells 2, 3 of the housing. Therefore, the pipe 101 can be inserted without problem into the openings 103.

In a preferred variant not represented in the drawings, the pipe 101 is provided at one of its two ends with a closure plate, which is substantially adjusted to the measurements of one of the two openings 103 in the housing 2, 3 of the activated carbon adsorber 100 in such a manner that the opening 103 can be closed by the closure plate. The closure plate can have protrusions and/or recesses as handling and/or fastening means, such as, for example, a thread that can work together with a thread on the opening 103 and/or on the screw cap 104.

In the particularly preferred embodiment represented in FIG. 8, into the hollow space 1011 in the pipe 101, a device for temperature compensation, or an air heater/air cooler module 102 can be introduced, if desired. In the case of the presence of the temperature compensation device 102, the breathing air reaches the worker at a comfortable temperature for the worker, which he/she selected to be warm in the winter, to avoid catching a cold. In summer, the worker can select the air temperature to be cooler to reduce perspiration.

As further indicated in FIG. 8, the temperature compensation device 102 comprises a cylindrical hollow body 106 made of a plastic with a hot air channel 1042 and with a cold air channel 1040, wherein the channels 1042 and 1040 adjoin one another in the longitudinal direction of the hollow body 106 and are in fluidic connection.

The inner diameter of the hot air channel 1042 is designed to be smaller than that of the cold air channel 1040; and the length of the hot air channel 1042 is substantially greater than the length of the cold air channel 1040. In the present embodiment example, the hot air channel 1042 is approximately four times as long as the cold air channel 1040.

Around the central axis of the body 106, in the radial direction, an air guiding element or air deflecting element extends over a large portion of the entire length of the hot air channel 1042. However, the air deflecting element can also be arranged in another suitable form. In the present embodiment example, the air guiding element also has a so-called star. On the cold air channel 1040, as an air guiding element, a circular disk-shaped air swirling element 141 is arranged, in particular, molded to form a single piece. The inner diameter of the air swirling element 141 is approximately twice as large as that of the cold air channel 1040. The air swirling element 141 is provided in the interior with several vortex elements, which extend in a radial direction around the central axis of the body 106, wherein each vortex element is hollow. In the preferred embodiment, the air swirling element 141 ends in an annular plate 144 [not shown in Figures] which, in the depicted preferred embodiment, is not attached on the cold air channel 1040, but on the hot air channel 1042, in particular formed on this channel 1042 so as to form a single piece. The annular plate 144 has a slightly smaller diameter than the cylindrical wall of the air swirling element 141. The hot air channel 1042 and the cold air channel 1040 are connected to one another in the area of the annular plate 144; in the present embodiment example, they are simply inserted in one another and they hold with press fit. With a view to achieving particularly good heating and cooling action, the inner diameter of the air swirling element 141 is approximately twice that of the hot air channel 1042. The principle of operation of the temperature compensation device according to the invention corresponds to a vortex or vortex pipe principle, and therefore, does not need to be explained in further detail. The depicted and described length/diameter ratios of hot air channel 1042 and cold air channel 1040, in the total body 102, in any case ensure an appropriate air temperature compensation for human use.

In a preferred embodiment of the invention, it is provided to fasten the activated carbon adsorber 100 via a special fastening element 4 and subsequently via a special adapter 15 on the hip belt 200. Such a fastening type brings the activated carbon adsorber 100 in the vicinity of one of the hands of the user, and thus, considerably increases user comfort.

The housing 2, 3 which can be seen in FIGS. 1A, 1B, 2A, 2B, 4 and 5 differs indeed in terms of contour and certain details from the housing 2, 3 shown in FIG. 8. However, essential details are in agreement, and therefore the invention is also described below in reference to this embodiment example.

The housing 2, 3 of the activated carbon adsorber as well accordingly comprises a first half shell 2 and a second half shell 3. The two activated carbon adsorbers, i.e., the activated carbon adsorber according to FIGS. 1A, 1B, 2A, 2B, 4 and 5, as well as the one according to FIG. 8, can be attached via their housing 2, 3 by means of the same fastening unit 4 to a hip belt 200 and removed again therefrom as needed.

The activated carbon adsorber 100 is provided with an air inlet connector 7 through which pressurized air can be introduced from an external pressurized air supply into the activated carbon adsorber 100. A connector 6 for a hose or the like, which leads to a breathing mask or hood, is arranged on the same side of the housing 2, 3 as the air inlet connector 7, but above this air inlet connector 7. Moreover, a port 9 is arranged on the other side of the activated carbon adsorber 100, which leads to the discharge of the pressurized air via a hose or the like to a pressurized air-operated hand tool, such as a paint spray gun. On the same side as this port 9, but above it, a regulator 8 is located, which is used to be able to set the pressure of the air leading to the breathing mask or hood. For safety reasons, the regulator 8 is configured in such a manner that the activated carbon adsorber 100 always delivers air at a predetermined pressure to the breathing mask or hood, even if the regulator 8 is set to "minimal."

The connector 6 for the connection to the breathing mask or hood and/or the air inlet port 9 for the paint gun can be closed when the activated carbon adsorber 100 is not in use by means of a blind cover or the like, if desired.

Preferably, the activated carbon adsorber 100 can be connected to a pressure display (not represented in the figures).

Figure 2A:
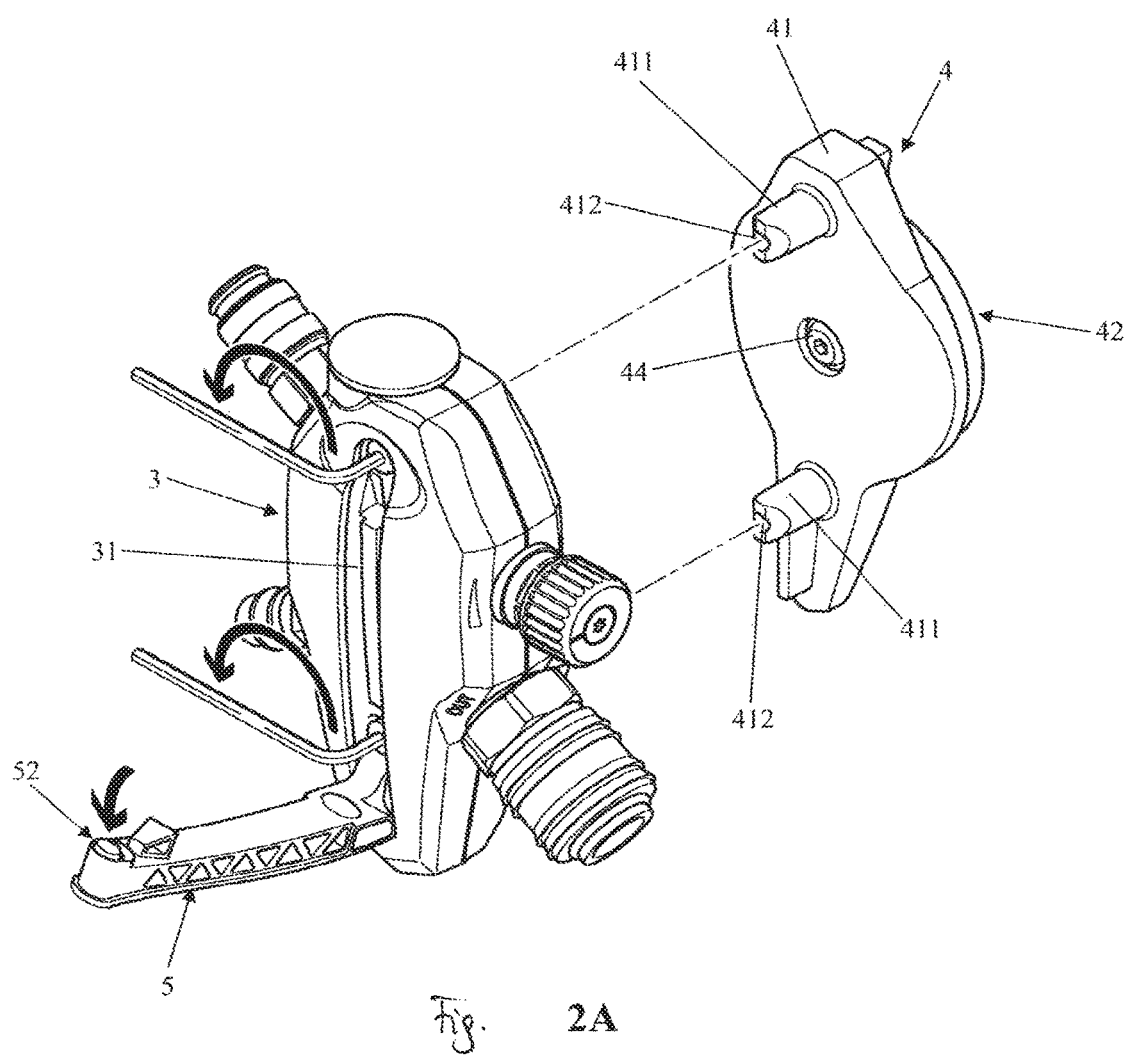
FIG. 2A shows an assembly drawing of the activated carbon adsorber according to an embodiment of the present invention with its fastening unit.
Figure 2B:
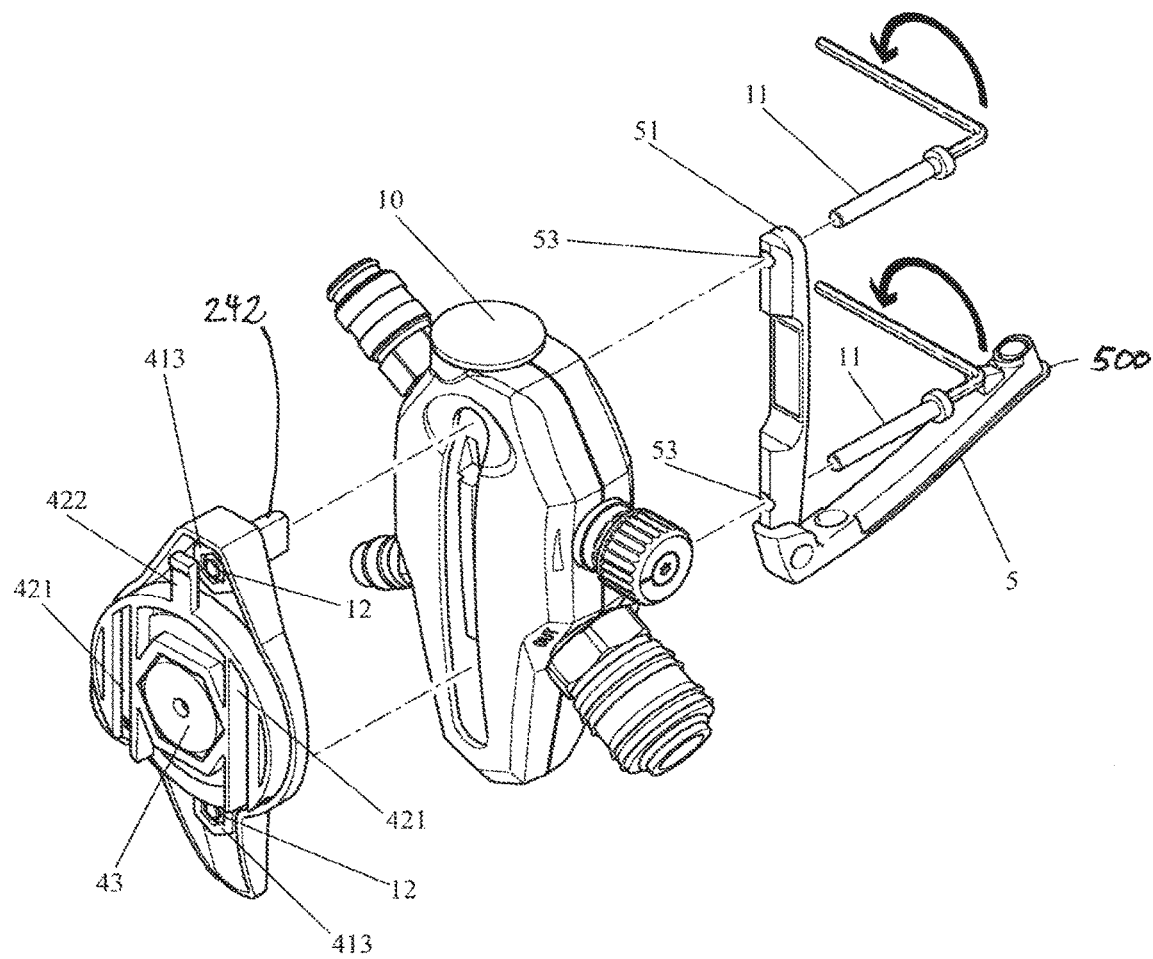
FIG. 2B shows an additional view of the assembly drawing.

In a preferred embodiment, shown in greater detail in FIGS. 2A, 2B and 8, the second half shell 3 of the activated carbon adsorber 100 is provided with a holder 5, which can be folded down or rotated, on which the spray gun or the breathing air hose can be held, when the spray gun or the respiration mask or hood is not used. As shown in FIG. 2B, a first arm of the holder 5, formed here with two arms, is fastened on the activated carbon adsorber 100 by means of a screw 11. The other, second arm of the holder 5 is hinged to the first arm and is otherwise freestanding. It can be twisted relative to the activated carbon adsorber 100.

As indicated in FIG. 2A, the second arm of the holder 5 can be rotated in an angle between 20° and 90°, preferably in an angle of 70°. Furthermore, a first locking element 52, preferably a magnet, is provided at the free end of the second arm of the holder 5. The locking element 52 works together with a second locking element (preferably with a magnet), which is provided on the activated carbon adsorber 100. In the present embodiment example, the second locking element is fastened on the holder 5 in the area of a plate seat 51, which is provided on the upper non-free end of the first arm of the holder 5. In summary, in the retracted position when not in use, the holder 5 can be held securely on the activated carbon adsorber 100. And, preferably, as shown in FIGS. 2A and 2B, a deepened groove 31 is made into the second half shell 3 of the housing. The groove 31 is adjusted dimensionally to the holder 5 so that the second arm, in the retracted position, lies flush in the groove 31, except for a handle 500 on the upper end.

Figure 3A:
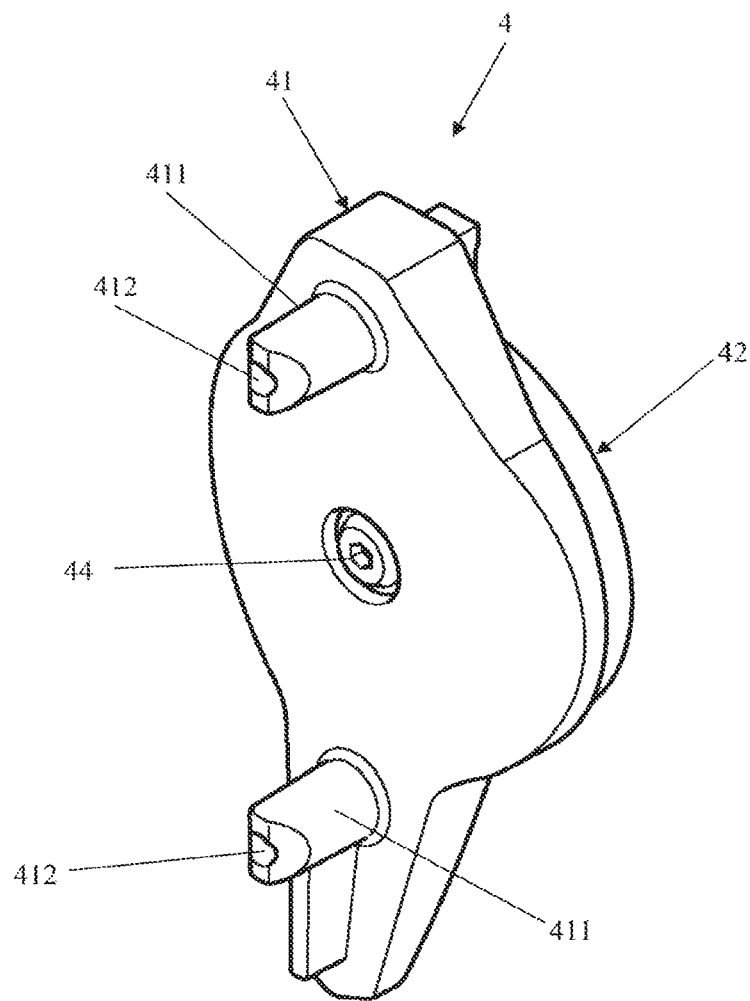
FIG. 3A further illustrates the fastening unit.
Figure 3B:
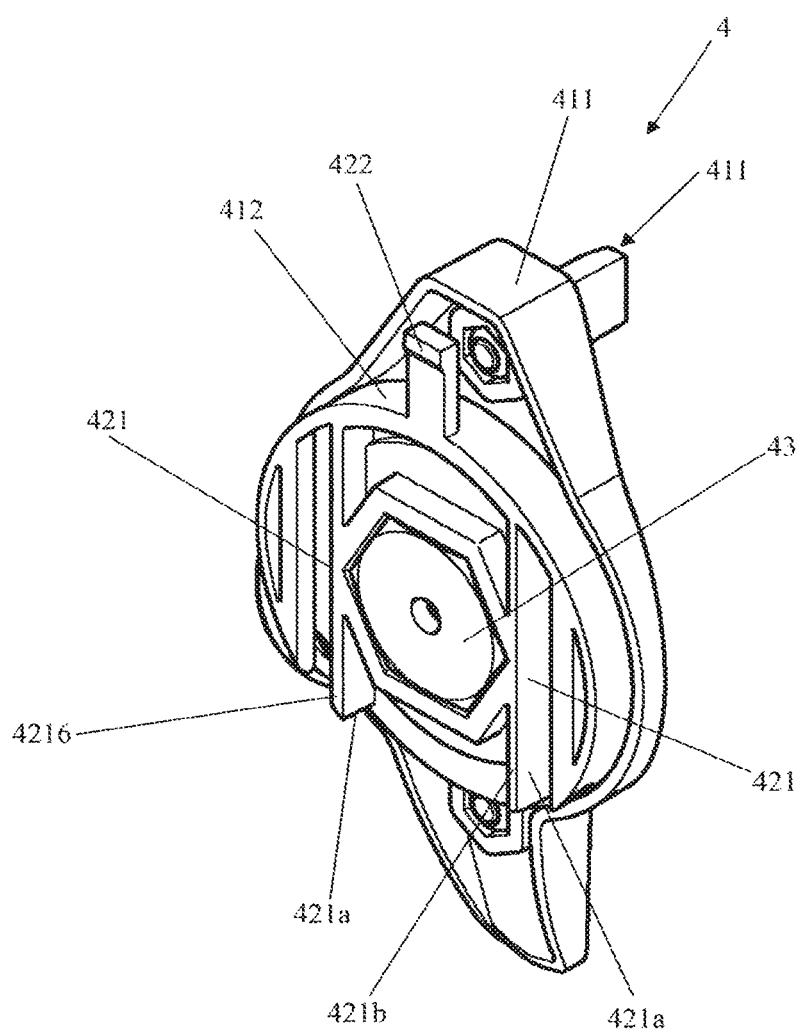
FIG. 3B shows another view of the fastening unit.

FIGS. 3A and 3B each illustrate the fastening unit 4 of the activated carbon adsorber 100 in a front view and in a back view. The fastening unit 4 comprises connection elements 41, 42, which are suitable for connecting the first half shell 2 of the housing of the activated carbon adsorber 100 to an adapter 15 which is part of a hip belt 200 (see FIG. 4).

As shown in FIGS. 3A and 3B, the first connection element 41 of the fastening unit 4, which in the present embodiment example is of substantially oval design, has two hollow protrusions 411, which are arranged at the top and at the bottom on the connection element 41 and which protrude in the direction of the first half shell 2 of the housing of the activated carbon adsorber. A fastening bore 412 is embedded in each protrusion 411. The first half shell 2 comprises corresponding fastening holes, into which the protrusions 411 can be inserted. As further shown in FIG. 2B, screws 11 are used, which engage through the plate seats 51 located at the top and at the bottom on the first arm of the holder 5 through fastening holes 53 made there, and subsequently through fastening holes in the first half shell 2 and in the second half shell 3 of the housing of the activated carbon adsorber 100. On the protrusions 411, the fastening unit 4 is fastened by means of bolts 12. In order to achieve a particularly secure fastening, bolt seats 413 for screws or the like are provided.

As shown in FIG. 3B, two sliding slots 421 are provided on the adapter area 42 of the fastening element 4. The adapter area 42 is circular in outline. An abutment contact 422 protrudes from the peripheral surface of the adapter area 42 away from the upper side of the adapter area 42. Two parallel protrusions 421b, which protrude close to the center of the adapter 42 from the circular surface, in each case represent the upper side of an inner wall 421a for one of the two sliding slots 421. For this purpose, the connection between the activated carbon adsorber 100 to a hip belt 200 can be accomplished in the manner according to the invention.

Figure 4:
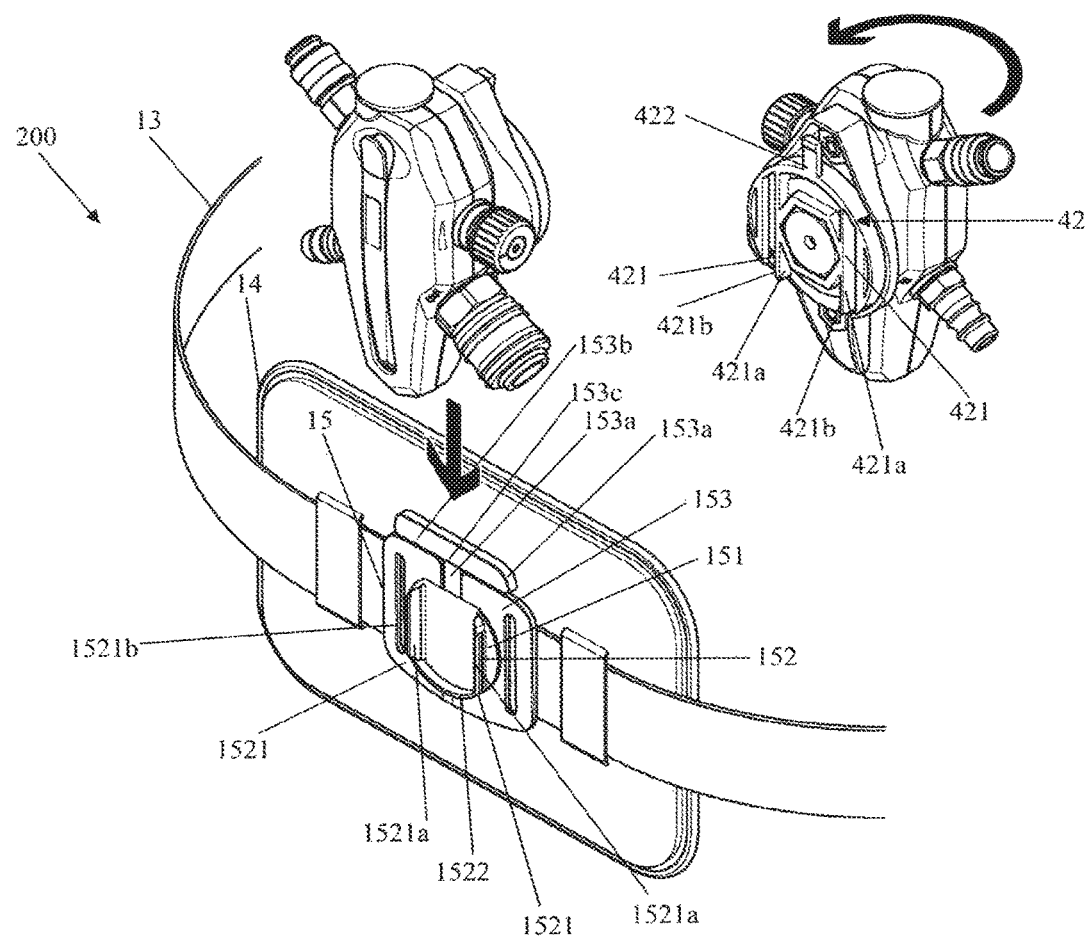
FIG. 4 shows the fastening of the activated carbon adsorber in a hip belt.
Figure 7:
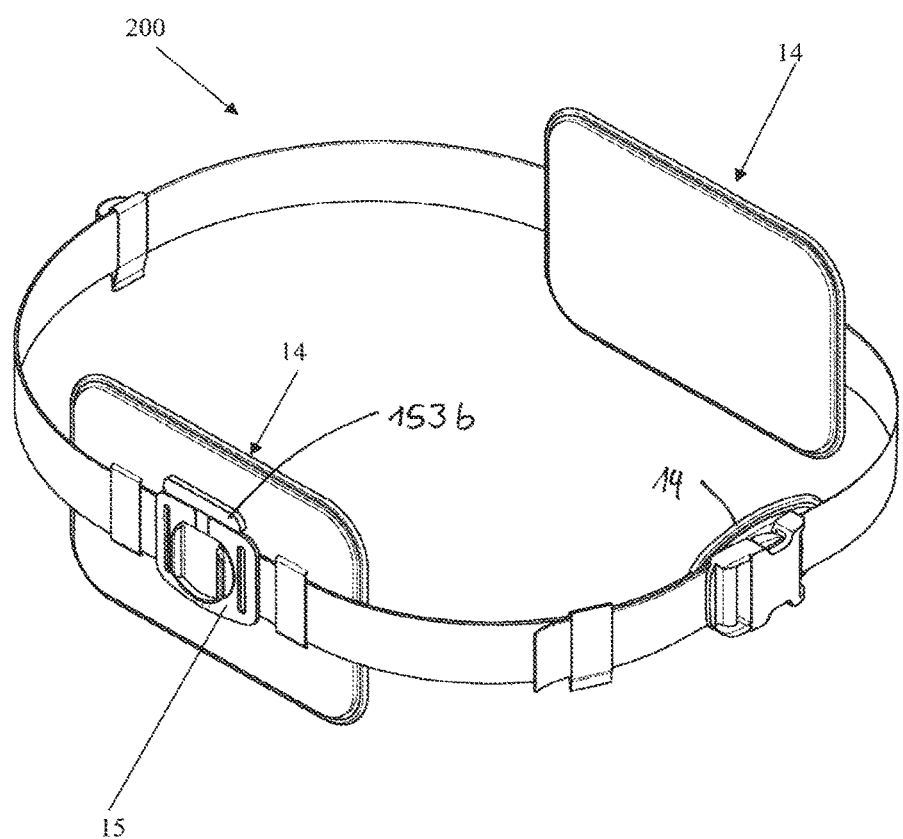
FIG. 7 shows the hip belt separately.

The hip belt 200 indicated in FIGS. 4 and 7 comprises a waist band 13 which is provided with a cushion 14 on an inner side. On an outer side, the waist band 13 is provided with an adapter 15 for the fastening unit 4 of the activated carbon absorber 100.

The adapter 15 comprises a support plate 151, supporting a fastening plate 152 and a release mechanism 153. On the adapter 15 two guide rails 1521 are provided, which are adjusted in terms of position and shape to the two sliding slots 421 on the adapter area 42 of the fastening element 4. An abutment element 1522 connects the two guide rails 1521 at their lower ends; the abutment 1522 and the two guide rails 1521 thus are essentially "U" shaped. Each guide rail 1521 comprises a rib 1521a, which projects from the fastening plate 152. The two ribs 1521a are arranged on the fastening plate 152 along the longitudinal direction of the waist band 13 and they extend parallel to one another along the broad direction of the waist band 13. The upper portion of each rib 1521a is provided with a protrusion 1521b which projects outward in the longitudinal direction of the waist band. Each protrusion 1521b defines, on the fastening plate 152, a guide or clamp for the sliding slots 421 on the adapter area 42 of the fastening element 4.

The release mechanism 153 has a single-arm lever 153a and a handle 153b which is connected to the lever 153a. As shown in FIG. 4, the lever 153a lies in a recess of the upper portion of the fastening plate 152. The lever 153a is produced from a relatively flexible material and can therefore be deformed when pressure is exerted on the handle 153b. In the present embodiment example, the lever 153a is produced to form a single piece with the fastening plate 152 and cut out of this plate 152. The handle 153b is molded on the upper end of the lever 153a so as to form a single piece. The upper surface of the handle 153b, in the present embodiment example, is greater than the surface of the lever, as a result of which an abutment surface 153c is formed between the handle 153b and the lever 153a.

FIG. 4 shows in further detail how the activated carbon adsorber 100 can be fastened via the adapter area 42 of the fastening element 4 on the hip belt 200 via its adapter 15 and detached again therefrom. The guide rails 1521 of the fastening plate 152 of the adapter 15 can, after a corresponding alignment, be introduced by means of a downward directed pressure into the sliding slots 421 of the adapter area 42 of the fastening unit 4. Since the protrusions 421b of the sliding slots 421 and the protrusions 1521b of the guide rails 1521 then engage into one another, the activated carbon adsorber 100 is securely fastened on the hip belt 200. The abutment element 1522 on the adapter 15 limits the sliding movements downward, so that an undesired lowering of the activated carbon adsorber 100 is prevented. The upper end of the abutment contact 422 on the fastening unit 4 prevents that the abutment surface 153c of the release mechanism 153 of the adapter 15 comes in undesirable contact with the activated carbon adsorber 100.

Figure 5:
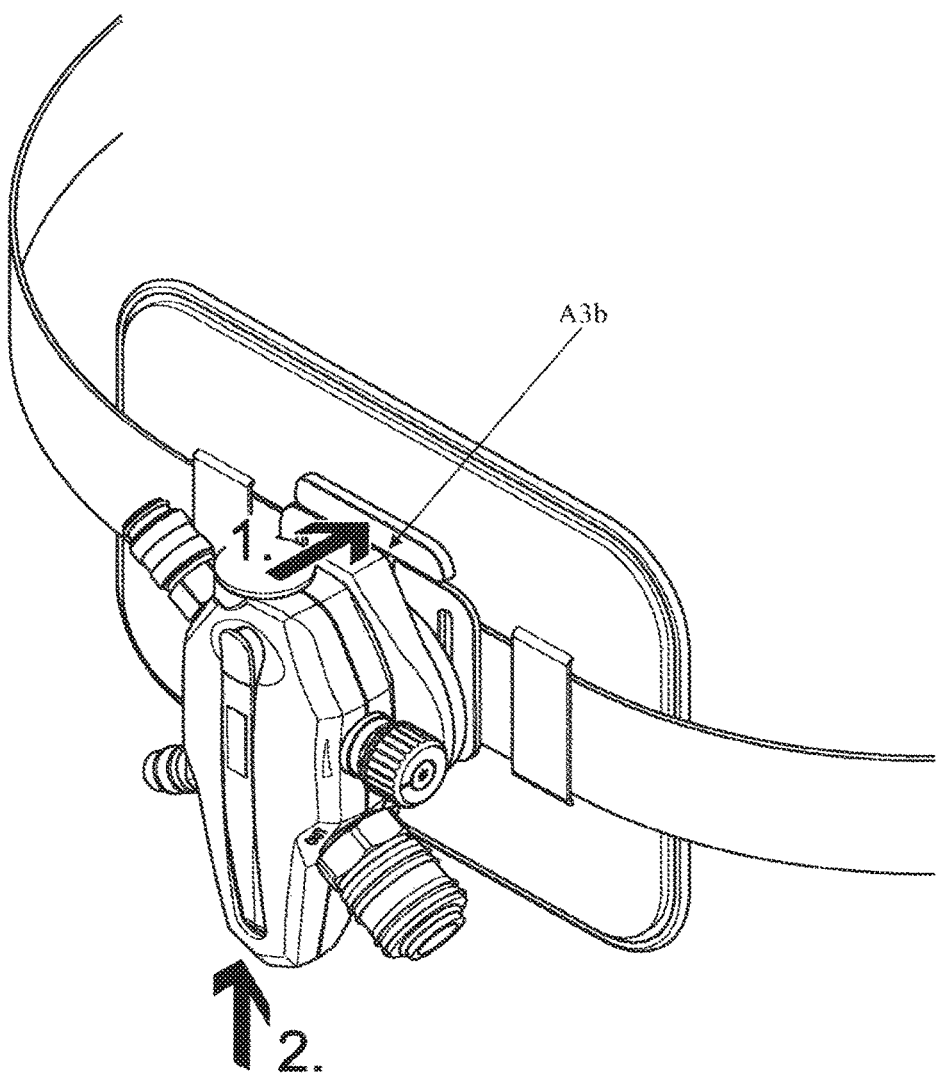
FIG. 5 shows the view of the removal of the activated carbon adsorber from the hip belt.
Figure 6:
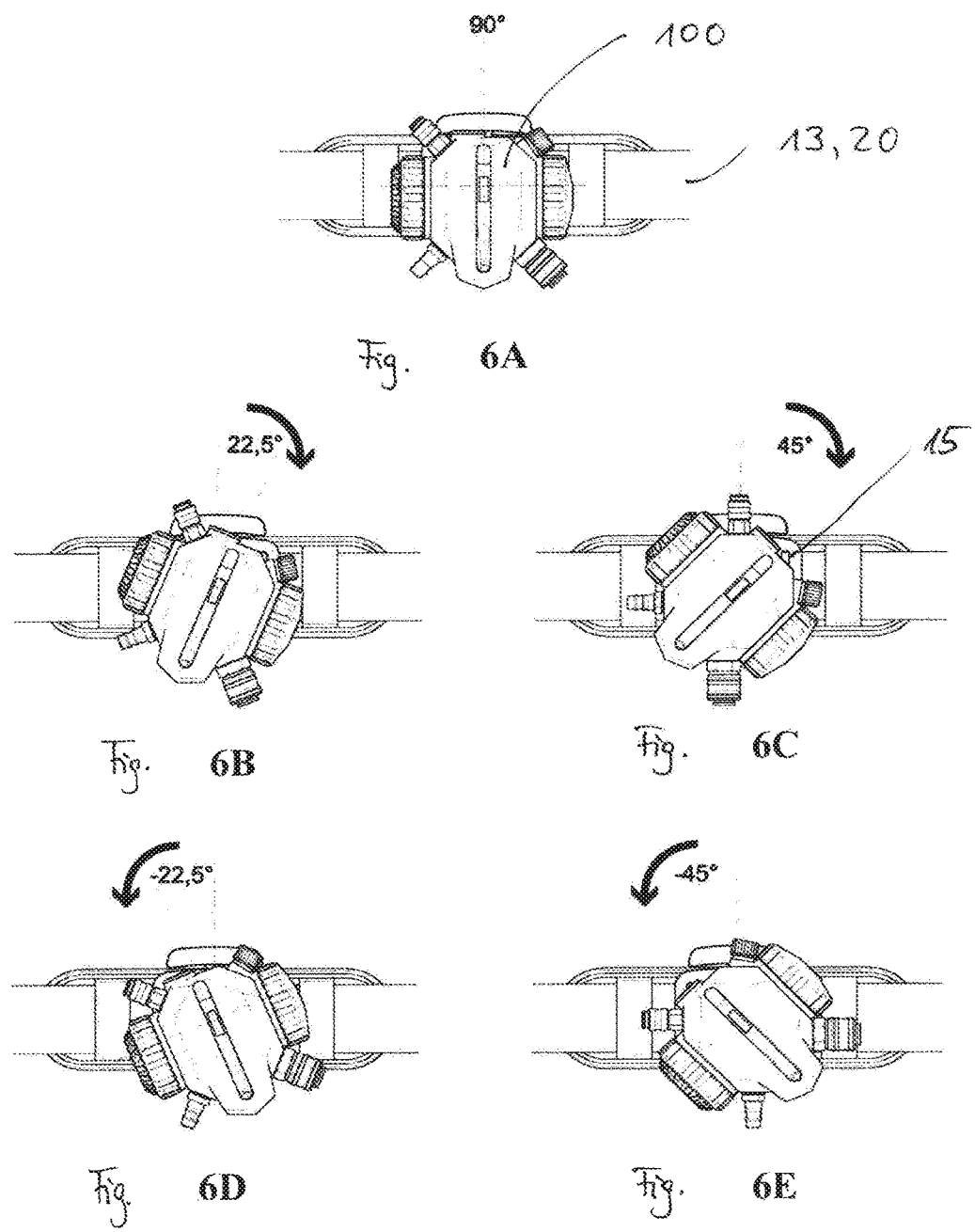
FIGS. 6A to 6E show the activated carbon adsorber in five different rotational angle positions according to an embodiment example of the present invention.

As shown in FIG. 5, the removal of the activated carbon adsorber 100 from the hip belt 200 can be carried out in a simple way. By bringing the abutment contact 422 in contact on the fastening unit 4 and the abutment surface 153c of the lever 153a by pressing the handle 153b in arrow direction 1 (FIG. 4), i.e., toward the support of the hip belt 200, the release mechanism 153 is triggered, and the activated carbon adsorber 100 can be removed by an upward movement in arrow direction 2 (FIG. 5).

Although the embodiment example describes and shows only an example with sliding slots 421 on the adapter area 42 of the fastening element 4 and guide rails 152 on the adapter 15 of the hip belt 200, it is possible, on the other hand, to provide sliding slots on the adapter and guide rails on the fastening unit. Other types of sliding or shifting movements or any other detachable connection, such as clip-on or snap-on connections are also possible.

As also shown in FIGS. 3A and 3B, the adapter 42 and the fastening unit 41 of the fastening unit 4 are connected by a thin hexagonal nut 43 and a screw 44. Since the adapter 42 is connected to the connection element 41, and can turn relative to one another, the activated carbon adsorber 100 (or another module fastened on the fastening unit 4) can be rotated with respect to the hip belt 200 (see FIGS. 6A to 6E of the preceding embodiment example). This contributes to further increasing the comfort for the operator.

Figure 1B:
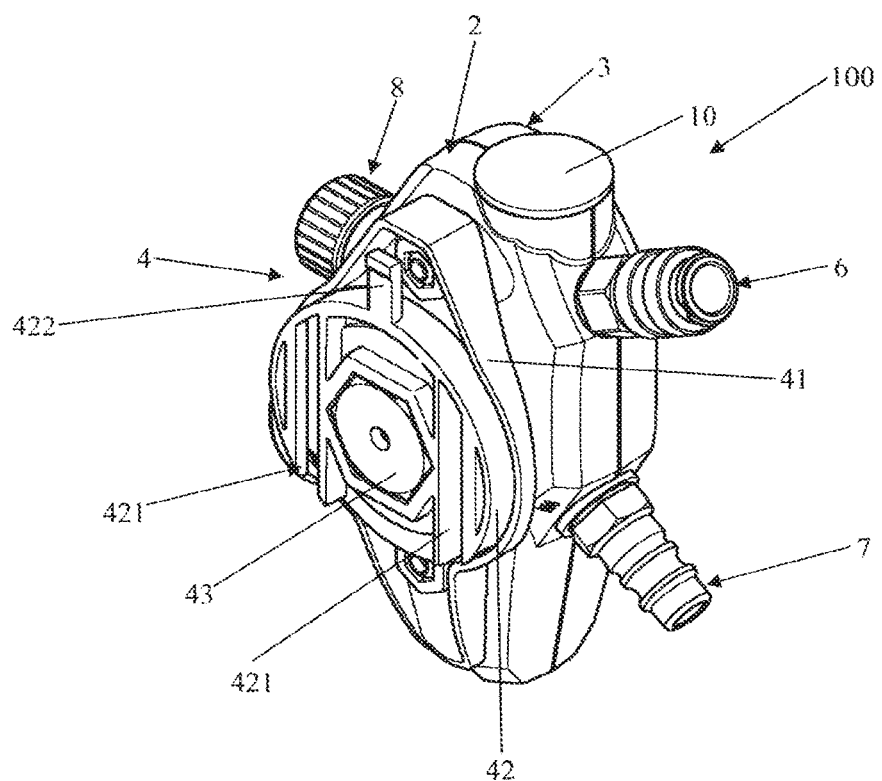
FIG. 1B illustrates the rear side of the activated carbon adsorber according to an embodiment of the present invention.

Furthermore, as shown in FIGS. 1A, 1B and 8, the activated carbon adsorber 100 is provided with a color code system disk 10 (CCS Disc). In the present embodiment example, a circular recess is embedded on the upper side of the housing 2, 3 of the activated carbon adsorber 100, into which the circular color code disk 10, which is also round, can be clipped.

Various activated carbon adsorbers 100 can be personalized with a color code system disk 10 of different color. Or, in this way, different activated carbon adsorbers can be associated with different breathing masks or hoods in a simple way. Other fastening types and color code system forms are naturally possible.

The use of marks other than color code disks is naturally possible. By means of the marks, the security of breathing devices is in any case further improved.

Preferably, all the elements or partial elements of the activated carbon adsorber 100 are made of plastic. In another possible embodiment, the two half shells 2, 3 of the housing can have different colors. When the colors of the half shells are adjusted to the colors of the hip belt or of the adapter 15, assembly errors can be almost excluded out.

In a further design of the invention, a connection to the activated carbon adsorber can occur at several sites on the hip belt. Preferably, two sites should be selected, which are later located on the left side and on the right side of the hip of the user when the hip belt is worn by the user. The activated carbon adsorber can then be switched from one side to the other, as a result of which the belt unit can be used by left handed and right handed persons without problem.

Finally, it is emphasized again that the above represents only preferred embodiments of the present invention, but that the present invention is in no way limited thereto. For the person skilled in the art in this field, the present invention can have different variants and modifications. All the modifications, equivalent substitutions, improvements that fall within the spirit and the principle of the present invention should be covered by the scope of protection.

The invention claimed is:

1. A device for purifying air for a breathing mask or hood using a filter cartridge formed in a pipe shape, the device comprising:
   a body having an inner chamber sized and dimensioned to receive the filter cartridge through a hole in the body, the hole having a cover;
   an air inlet port formed through the body, to receive compressed air from an air supply unit;
   a connector for connection to the breathing mask or hood;
   a support unit fastenable to the body and detachably connectable with another component; and
   a temperature module including at least one of an air heater and an air cooler positioned within the body and sized and dimensioned to pass into the hollow space of the pipe shape of the filter cartridge as the filter cartridge is inserted into the hole in the body.

2. The device of claim 1, wherein the body includes two mating and mutually facing sides, each of the two sides forming a part of the hole in the body through which the filter cartridge is inserted.

3. The device of claim 1, wherein the body consists of two hollow half spheres or half shells.

4. The device of claim 2, wherein the cover is threadably fastenable to the body.

5. The device of claim 1, further including a second hole in the body and a cover for the second hole, the temperature module insertable into the body through the second hole.

6. The device of claim 1, further including a wearable component having at least one of guide rails or slots,
   the support unit including at least one of rails or slots for slidingly connecting to the at least one of guide rails or slots of the wearable component while the wearable component is worn on the body to releasably maintain the device upon the body of the wearer.

7. The device of claim 6, wherein the body is rotatably connected to the support unit and is able to rotate with respect to the wearable component while the wearable component is worn on the body.

8. The device of claim 6, further including a pressable abutment contact positioned proximate the connected at least one of guide rails or slots of the support unit and the at least one of guide rails or slots of the wearable component to block sliding movement of the wearable component with respect to the support unit until the pressable abutment contact is pressed.

9. The device of claim 1, further including:
   a holder pivotably fastened to extend away from the body when opened, the holder sized and dimensioned to support the breathing mask or hood when the breathing mask or hood is not worn and the holder is opened; and
   a locking element affixed to the holder and a corresponding locking element is affixed to the body, so that the holder is releasably secured in a non-opened position against the body when the holder is pivoted closed.

10. The device of claim 9, wherein the locking element affixed to the holder and the corresponding locking element affixed to the body are magnets.

11. The device of claim 1, further including a pressure display.

12. The device of claim 1, further including a port for connection to a pressurized air-operated hand tool.

13. The device of claim 1 further including a belt unit sized and dimensioned to support the device when worn upon the body of a user of the device.

14. The device of claim 13, the belt unit including at least one adapter capable of forming a detachable sliding connection with the device, the adapter sized and dimensioned to secure the device upon the belt unit while the device is being used and the belt unit is worn.

15. The device of claim 14, the belt unit further including a release mechanism positioned and shaped to secure the device to the belt unit until the release mechanism is pressed.

16. The device of claim 14, the sliding connection formed by at least one elongate guide connected to the belt unit, and at least one elongate guide connected to the device that is mateable with the at least elongate guide connected to the belt unit.

17. The device of claim 16, further including at least one securing surface positioned to block relative sliding movement of the at least one elongate guide of the belt unit and the at least one guide of the device to thereby prevent separation of the belt unit and the device.

18. The device of claim 15, wherein the release mechanism is a lever mechanism.

19. The device of claim 18, wherein the lever mechanism is one-armed and fits into a recessed area of the adapter.

20. The device of claim 18, wherein the lever mechanism is produced from a flexible material.

21. The device of claim 18, wherein the lever mechanism comprises a lever and a handle.

22. The device of claim 21, wherein at least one abutment surface is present between the lever and the handle.

23. The device of claim 14, wherein the device is supported on a cushion.

24. The device of claim 14, wherein a connection between the adapter and the device is present at several sites.

25. A device for purifying air using an air purifying cartridge having a pipe shape, the device useable with a breathing mask or hood having an extending air hose, the device comprising:
a body;
an air inlet port connected to the body and sized and dimensioned to form a connection to a source of compressed air;
a connector connected to the body and sized and dimensioned to connect to the air hose extending to the breathing mask or hood;
a support unit connected to the body and detachably connectable to an external base when the device is worn by a user,
a covered opening in the body sized and dimensioned to receive the air purifying cartridge having a pipe shape when the covered opening is uncovered;
a temperature module for at least one of cooling or heating the compressed air from the source of compressed air, the temperature module positioned, sized and dimensioned to insert into the pipe shape of the air purifying cartridge when the air purifying cartridge is inserted into the opening in the body; and
a holder pivotally connected to the body between a closed position against the body and an open position extending from the body, the holder including a locking element and the body including a mating locking element, the locking element of the holder and the locking element of the body mating when the holder is in the closed position to releasably secure the holder in the closed position.

26. A device for purifying air using an air purifying cartridge having a pipe shape, the device useable with a breathing mask or hood having an extending air hose, the device comprising:
a body;
an air inlet port connected to the body and sized and dimensioned to form a connection to a source of compressed air;
a connector connected to the body and sized and dimensioned to connect to the air hose extending to the breathing mask or hood;
a first covered opening in the body sized and dimensioned to receive the air purifying cartridge having a pipe shape when the covered opening is uncovered; and
a temperature module for at least one of cooling or heating the compressed air from the source of compressed air, the temperature module positioned, sized and dimensioned to insert into the pipe shape of the air purifying cartridge when the air purifying cartridge is inserted into the opening in the body.

27. The device of claim 26, further including a base wearable by a user of the device; and
an adapter connected to the device and releaseably securable to the wearable base to enable the device to pivot in connection with the base.

28. The device of claim 27, the base and the adapter mutually forming a dovetail connection to secure the device to the base.

29. The device of claim 28, further including a resilient blocking lever which prevents the dovetail connection from sliding and separating in a first relaxed position, and which enables the dovetail connection to slide and separate in a second bent position.

30. The device of claim 26, the covered opening sized, shaped, and dimensioned to correspond to a radial end profile of the pipe shape of the air purifying cartridge to enable insertion of the air purifying cartridge along an axial direction only, to thereby surround the temperature module after insertion.

31. The device of claim 26, further including a holder pivotally connected to the body between a closed position against the body and an open position extending from the body, the holder including a locking element and the body including a mating locking element, the locking element of the holder and the locking element of the body mating when the holder is in the closed position to releasably secure the holder in the closed position.

32. The device of claim 26, wherein the temperature module is removable, and further including a second covered opening in the body sized and dimensioned to enable insertion or removal of the temperature module.

33. The device of claim 32, wherein the second opening and the temperature module are positioned and shaped to enable the temperature module to be inserted or removed when the air purifying cartridge has been received through the first covered opening.

34. The device of claim 1, wherein the body includes a marking element that corresponds to an indicia on the breathing mask or hood to match the device with the breathing mask or hood.

* * * * *